United States Patent [19]

Lyden

[11] 4,342,375

[45] Aug. 3, 1982

[54] POROUS ROD METERING VALVE

[75] Inventor: Frank J. Lyden, Manitowoc, Wis.

[73] Assignee: Oil-Rite Corporation, Manitowoc, Wis.

[21] Appl. No.: 858,200

[22] Filed: Dec. 7, 1977

Related U.S. Application Data

[63] Continuation-in-part of Ser. No. 595,118, Jul. 11, 1975, Pat. No. 4,062,424.

[51] Int. Cl.³ ............................................. F16N 27/00
[52] U.S. Cl. ......................................... 184/65; 184/87; 210/446
[58] Field of Search ................... 210/446, 456, 510; 184/87, 85, 102, 7 CR, 96, 58, 59, 7 E, 65

[56] References Cited

U.S. PATENT DOCUMENTS

| | | | |
|---|---|---|---|
| 227,570 | 5/1880 | Paulson | 184/87 X |
| 306,542 | 10/1884 | Smith | 184/87 |
| 441,681 | 12/1890 | Mitchell | 184/87 X |
| 891,377 | 6/1908 | Samuelson | 184/7 CR |
| 992,229 | 5/1911 | Mille | 184/85 |
| 1,687,780 | 10/1928 | Neale | 184/87 X |
| 2,583,457 | 1/1952 | Woodell | 184/102 |
| 2,788,128 | 4/1957 | Heine | 210/510 UX |
| 2,789,654 | 4/1957 | Zurit | 210/446 X |
| 3,042,079 | 7/1962 | Swift et al. | 210/510 X |

*Primary Examiner*—David H. Brown
*Attorney, Agent, or Firm*—Andrus, Sceales, Starke & Sawall

[57] ABSTRACT

A porous rod for inclusion in a lubricant metering valve is provided with radially projecting means forming an annular shoulder intermediate the length of the rod. The rod is tightly enveloped in an impervious sleeve which extends over at least a portion of the length of the rod. An annular sealing member is disposed on the rod in engagement with the shoulder, the sleeve and the opposed wall of the bore of the valve. The sealing member is compressed into proper sealing mode with assembly of the male and female valve members to preclude passage of lubricant through the valve except by passage through the porous rod.

8 Claims, 7 Drawing Figures

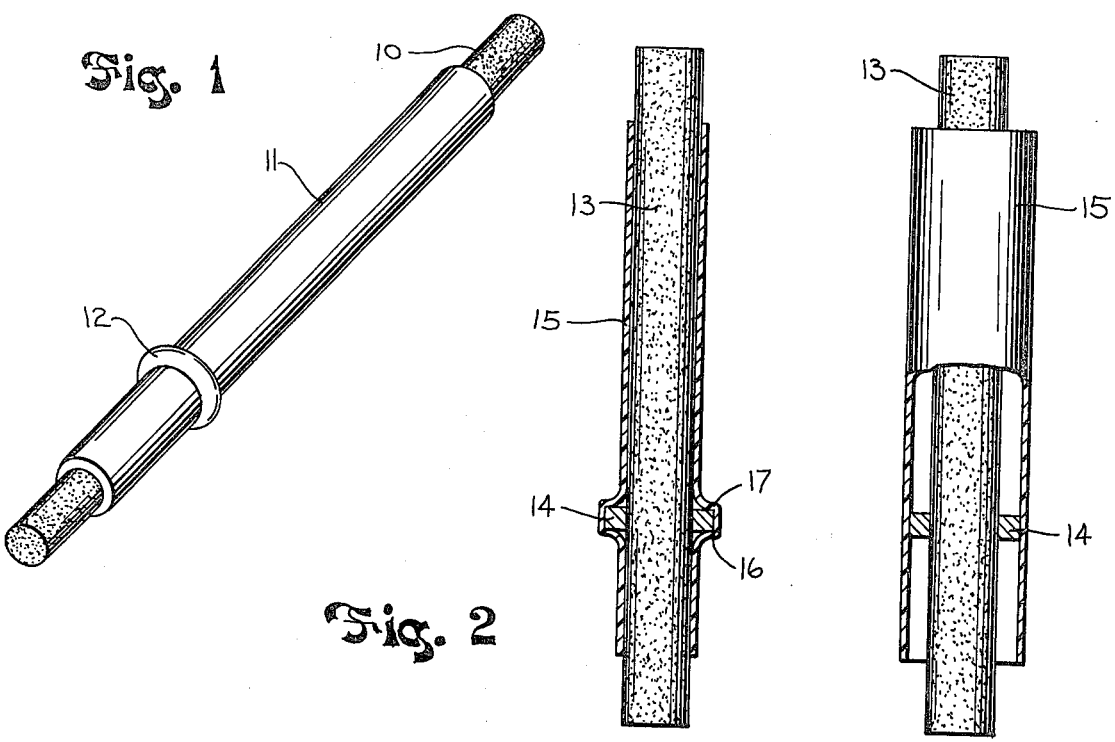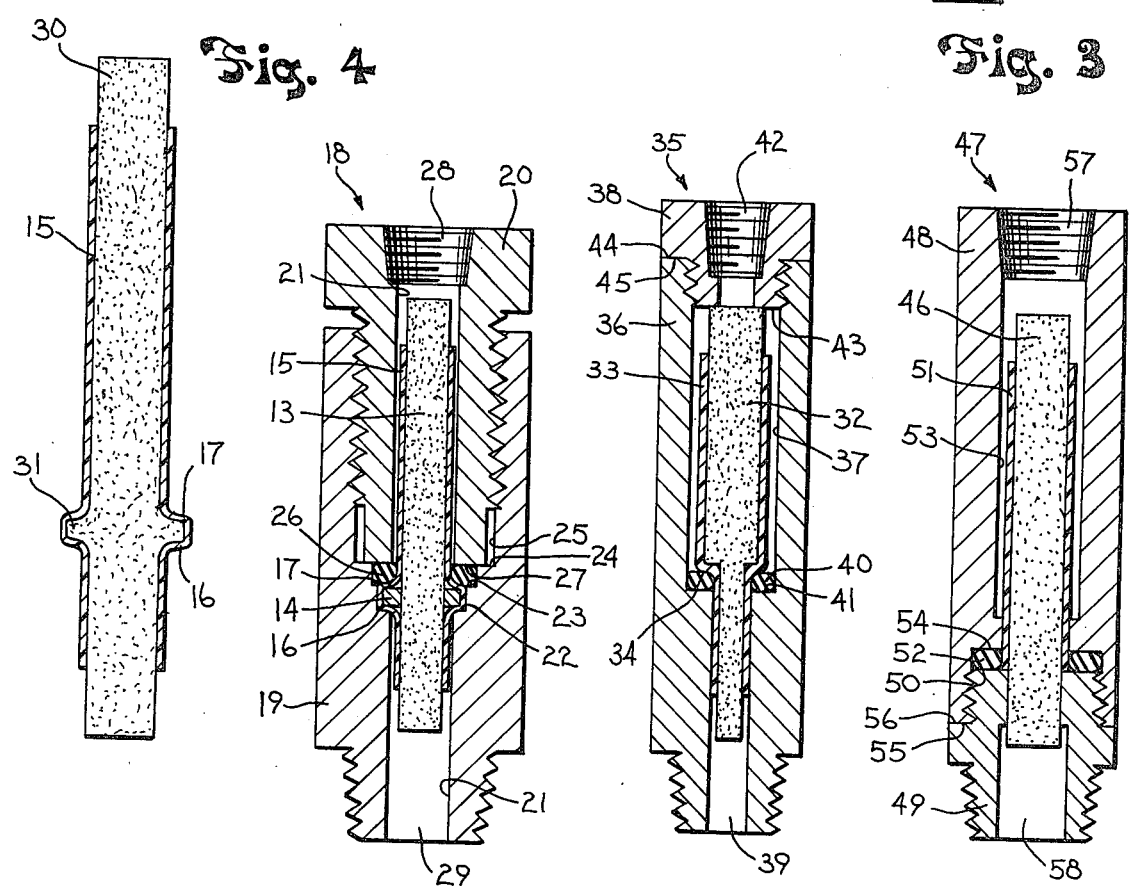

POROUS ROD METERING VALVE

BACKGROUND OF THE INVENTION

This application is a continuation-in-part of my co-pending application, Ser. No. 595,118, filed July 11, 1975, entitled "Oiler Assembly and now issued to U.S. Pat. No. 4,062,424."

The invention relates to lubricant metering rods and their assembly within a valve unit.

In the several valve assemblies illustrated in the co-pending case, the metering rods generally functioned properly as initially assembled in the valves. It was discovered, however, that when a customer or user disassembled the valves for cleaning, changing rods or for whatever reason, the rod and its seal were frequently incorrectly reassembled into the valve so that lubricant would by-pass the rod and so render the valve ineffective to provide the desired metered flow therethrough. It is generally an object of this invention to provide a metering rod and valve assembly structure which, upon disassembly, is more likely to be correctly and properly reassembled.

SUMMARY OF THE INVENTION

Generally, the invention relates to a lubricant metering valve assembly having a through bore with an inlet at one end thereof and an outlet at the other end. The assembly comprises generally female and male valve members. A porous rod is disposed in the bore and is provided with radially projecting means to form an annular shoulder intermediate the length of the rod. An impervious sleeve tightly envelopes the rod and extends over at least a portion of the length thereof. An annular sealing member is disposed on the rod in engagement with said shoulder, the sleeve, and the wall of the valve bore. The sealing member is compressed into proper sealing mode with assembly of the valve members to preclude passage of lubricant through the valve except by passage through the porous rod.

DESCRIPTION OF THE DRAWING FIGURES

The drawings furnished herewith illustrate the best mode presently contemplated for the invention and are described hereinafter.

In the drawings:

FIG. 1 is a perspective view of the coated porous rod with sealing ring as depicted in the parent application;

FIG. 2 is a side elevation of a porous rod according to this invention with a ferrule or collar intermediate its length and secured thereon by a heat shrunk coat or sleeve to form a contoured shoulder;

FIG. 3 is a side elevation of the porous rod of FIG. 2 showing the assembly with ferrule and prior to the shrinkage of the sleeve thereon;

FIG. 4 is a view similar to that of FIG. 2 with the countoured shoulder having been formed by a molded in projection on the rod;

FIG. 5 is a sectional elevation showing the coated rod of FIG. 2 seated within a valve body;

FIG. 6 is a sectional elevation showing a coated rod having a stepped diameter seated within a valve body; and FIG. 7 is a sectional elevation showing a coated rod seated within a valve body and wherein the rod is press fitted within a valve member.

DESCRIPTION OF THE ILLUSTRATED EMBODIMENTS

According to my copending application, Ser. No. 595,118, the lubricant metering rod 10 of FIG. 1 is generally described as being of sintered construction and having a selected porosity. The rod 10 is provided with an impervious coat or sleeve 11 over at least a portion of its length. As shown and described in the copending application, the coated rod 10 is disposed in the bore of a valve body with an annular sealing member 12, which may be an O-ring seal, interposed between the sleeve 11 and the wall of the bore to preclude passage of lubricant through the valve except by passage through the rod.

The length of the sleeve 11 determines the length of the flow path for the lubricant passing through the rod 10 and so establishes the feed rate for a rod of selected porosity. The sleeve 11 may be of a plastic material which is shrunk under heat to tightly envelop the rod. If made of plastic, the sleeve 11 is peelable to alter the length of the lubricant flow path and so provide for some adjustment upward of the feed rate through the rod 10.

In the field, some customers have experienced difficulty with the metering valves disclosed in application, Ser. No. 595,118. Upon removal and reinsertion or replacement of the rod 10, the sealing member 12 would sometimes fail to properly seal and so allow lubricant to by-pass the rod to render the valve ineffective as a lubricant metering device.

According to FIGS. 2-7 of this application, the porous rod is provided with a shoulder offering a fixed seat for a sealing member and the combination is clamped or secured in the valve body to preclude passage of lubricant through the valve except by passing through the rod.

Referring to FIGS. 2 and 3, the cylindrical porous rod 13 may be generally similar to the rod 10 of FIG. 1. A ring or ferrule 14 is slipped onto the rod 13 to a desired position intermediate its length. An impervious plastic coat or sleeve 15 is disposed exteriorly of the ferrule 14 and extends over at least a portion of the length of the rod 13. The sleeve 15 is heat shrunk to tightly envelop the tubular surface of the rod 13 and the ferrule 14 to secure the ferrule in the desired position as generally shown in FIG. 2. The enveloped ferrule 14 provides the coated rod 13 with opposed annular shoulders 16 and 17 intermediate its length.

The coated metering rod 13 is disposed in a generally tubular valve unit 18 as generally shown in FIG. 5 and comprising a female valve member 19 and a male valve member 20 having a common bore 21 when assembled. The bore 21 of the female member 19 is stepped outwardly to provide longitudinally spaced annular shoulders 22, 23 and 24. The enlarged bore portion 25 of member 19 is provided with internal threads for engagement by the externally threaded male member 20 upon assembly.

In the assembly of the coated rod 13 in the bore 21 of the valve unit 18, the shoulder 16 on the rod seats against the bore shoulder 22. The spacing between the opposed shoulders 16 and 17, as provided by the coated ferrule 14, is generally equal to the spacing between the bore shoulders 22 and 23 such that the shoulder 23 generally comprises an extension of the shoulder 17 for support of the O-ring seal 26 in the valve assembly. The spacing between the shoulders 23 and 24 is generally such as to provide for compression of the O-ring seal 26 into its proper sealing mode when the corresponding end 27 of the male valve member 20 is threaded into abutting relation with the shoulder 24 of the female valve member 19 and the coated rod 13 is secured in fixed position in the valve unit 18. With the rod 13 and seal 26 so disposed, lubricant is precluded passage through the valve unit 18 from the inlet end 28 to the outlet end 29 except by passage through the porous rod.

The porosity of rod 13 is selected in accordance with the feed rate needed at the point of lubrication. The plastic coat or sleeve 15 on the rod 13 may be of different colors to provide for color coding and so indicate the porosity of available rods. The feed rate of a given valve unit 18 is also dependent on the length of the coat or sleeve 15 which establishes the length of the flow path of the lubricant through the rod 13. The plastic coat or sleeve 15 is peelable to alter the length of the flow path through the rod 13 and so provide adjustment of the feed rate upwardly for a given rod, if desired.

The porous rod 30 of FIG. 4 is in most respects similar to the rod 13. In place of the ferrule 14 which provides for the opposed shoulders 16 and 17 on the coated rod 13, the rod 30 is provided with a molded in radial projection 31 to form the opposed annular shoulders. The coated rod 30 may be used in applications generally similar to those for rod 13 and could be substituted for rod 13 in the valve unit 18 of FIG. 5.

The rod 32 in FIG. 6 has a stepped cylindrical surface tightly enveloped by the impervious plastic sleeve 33 to form the shoulder 34 intermediate its length. The coated rod 32 is disposed in the valve unit 35 comprising a female valve member 36 having a stepped bore 37 and a male valve member 38. The portion of coated rod 32 of reduced section is disposed in the reduced section bore portion adjacent the outlet end 39 of valve member 36 with an O-ring seal 40 disposed between the shoulder 34 and the opposed bore shoulder 41. The entrance to the bore 37 is threaded to threadedly receive the valve member 38 providing the inlet 42 to the valve unit 35. The inner end 43 of valve member 38 engages with the corresponding end of the coated rod 32 and the seal 40 is compressed into its proper sealing mode when the opposed shoulders 44 and 45 on the respective valve members 36 and 38 are drawn together. The coated rod 32 is simultaneously secured in fixed position in the valve unit 35. With the rod 32 and seal 40 so disposed, lubricant is precluded passage through the valve unit 35 except by passage through the porous rod.

In the embodiment of FIG. 7, the rod 46 is disposed in the valve unit 47 comprising a female valve member 48 and male valve member 49. The male valve member 49 is press fitted onto one end of the rod 46 to provide the rod with an annular shoulder 50. An impervious plastic coat or sleeve 51 is heat shrunk to tightly envelop the rod and extends to the shoulder 50. An O-ring seal 52 is disposed around the coated rod 46 on the shoulder 50. Upon assembly, the coated rod 46 projects into the bore 53 of the female valve member 48 and the seal 52 is trapped between shoulder 50 and the opposed shoulder 54 on the female member. The position of the coated rod 46 is fixed relative to the valve unit 47 and the seal 52 is compressed into its proper sealing mode between the spaced shoulders 50 and 54 when the members 48 and 49 are fully threadedly engaged to bring their respective shoulders 55 and 56 into abutting relation. With the rod 46 and its seal 52 so disposed, lubricant is precluded passage through the valve unit 47 from its inlet end 57 to the outlet end 58 except by passage through the rod.

With the invention providing for a fixed position of the O-ring seal in relation to the metering rod and of the rod within the metering valve, leakage past the seal will ordinarily be precluded when a rod is reinserted or replaced in the valve assembly. The seal arrangement is equally effective whether the lubrication point imposes a pressure or vacuum condition.

Various modes of carrying out the invention are contemplated as being within the scope of the following claims, particularly pointing out and distinctly claiming the subject matter which is regarded as the invention.

I claim:

1. In a lubricant metering valve having a through bore with an inlet at one end thereof and an outlet at the other end and comprising engaging male and female valve members, a porous rod disposed in said bore and being provided with radially projecting means to form an annular shoulder intermediate the length of the rod, an impervious sleeve tightly enveloping said rod and extending over at least a portion of the length thereof, and an annular sealing member disposed on the rod in engagement with said shoulder and said sleeve and the wall of the valve bore, said sealing member being compressed into proper sealing mode with assembly of the valve members to secure the rod and sealing member within the valve and preclude passage of lubricant through the valve except by passage through the porous rod.

2. The construction of claim 1 wherein the radially projecting means on the porous rod is formed by a molded in radial projection, and the impervious sleeve envelops the projection.

3. The construction of claim 1 wherein the radially projecting means on the porous rod is formed by a stepped surface on the rod to provide the annular shoulder and the impervious sleeve envelops the rod shoulder, said bore in the female valve member being correspondingly stepped to provide a shoulder opposed to the rod shoulder, said sealing member being disposed between the opposed shoulders, said male valve member engaging the rod and compressing the seal to secure the rod and sealing member in the valve.

4. The construction of claim 1 wherein the radially projecting means on the porous rod is formed by a ferrule which is slipped onto the rod, and the impervious sleeve envelops and retains the ferrule in the desired position.

5. The construction of claim 4 wherein the bore of the female valve member is stepped outwardly to form a series of three longitudinally spaced shoulders, said sleeve enveloped ferrule and sealing member being seated on successive shoulders of the female valve member with the male valve member being seated on the third shoulder and engaging the sealing member to secure the rod and sealing member in the valve.

6. In a lubricant metering valve having a through bore with an inlet at one end thereof and an outlet at the other end and comprising engaging male and female valve members, a porous rod disposed in said bore, means disposed intermediate the length of the rod and forming a radially outwardly projecting annular shoulder on the rod, an impervious sleeve tightly enveloping said rod and extending over at least a portion of the length thereof, and an annular sealing member disposed on the rod in engagement with said shoulder and said sleeve and the wall of the valve bore, said sealing member being compressed into proper sealing mode with assembly of the valve members to secure the rod and sealing member within the valve and preclude passage of lubricant through the valve except by passage through the porous rod.

7. The construction of claim 6 wherein the means disposed intermediate the length of the rod and forming a radially outwardly projecting annular shoulder on the rod comprise one of the valve members which is press fitted onto one end of the rod, and said impervious sleeve extends along the rod from said shoulder with the sealing member disposed on said shoulder and engaging the sleeve, said other valve member having a shoulder opposed to the first valve member shoulder to compress the seal when the valve members and rod are assembled together.

8. The construction of claim 7 wherein the valve member press fitted onto the end of the rod is the male valve member.

* * * * *